US009189298B2

(12) United States Patent
Chiu et al.

(10) Patent No.: US 9,189,298 B2
(45) Date of Patent: Nov. 17, 2015

(54) PROCESSING SYSTEM AND METHOD FOR CONNECTING A REMOTE USB DEVICE AUTOMATICALLY

(75) Inventors: Tang-En Chiu, Taipei (TW); Ming-Huei Wu, Taipei (TW); Yao-Lu Tsai, Taipei (TW); Ze-Kai Hsiau, Taipei (TW)

(73) Assignee: KCODES CORPORATION, Taipei (TW)

( * ) Notice: Subject to any disclaimer, the term of this patent is extended or adjusted under 35 U.S.C. 154(b) by 769 days.

(21) Appl. No.: 12/891,942

(22) Filed: Sep. 28, 2010

(65) Prior Publication Data
US 2011/0173338 A1 Jul. 14, 2011

(30) Foreign Application Priority Data
Jan. 12, 2010 (TW) .............................. 99100636 A

(51) Int. Cl.
*G06F 15/16* (2006.01)
*G06F 9/54* (2006.01)
*G06F 9/50* (2006.01)

(52) U.S. Cl.
CPC ................ *G06F 9/54* (2013.01); *G06F 9/5055* (2013.01)

(58) Field of Classification Search
CPC . H04L 69/24; H04L 41/0806; H04L 41/0886; G06F 9/5011; G06F 9/54; G06F 9/5055
USPC ..................... 709/225–229; 710/16
See application file for complete search history.

(56) References Cited

U.S. PATENT DOCUMENTS

| | | | | |
|---|---|---|---|---|
| 5,630,076 A | * | 5/1997 | Saulpaugh et al. ........... | 710/104 |
| 5,944,794 A | * | 8/1999 | Okamoto et al. ............. | 709/225 |
| 6,832,273 B2 | * | 12/2004 | Ray et al. ........................ | 710/42 |
| 7,168,003 B2 | * | 1/2007 | Lozano et al. .................. | 714/25 |
| 7,260,597 B1 | * | 8/2007 | Hofrichter et al. ............. | 709/200 |
| 7,284,061 B2 | * | 10/2007 | Matsubayashi et al. ....... | 709/229 |
| 7,310,670 B1 | * | 12/2007 | Walbeck et al. ............... | 709/225 |
| 7,480,740 B1 | * | 1/2009 | Saxena et al. ..................... | 710/8 |
| 7,765,280 B2 | * | 7/2010 | Akins, III ..................... | 709/219 |

(Continued)

FOREIGN PATENT DOCUMENTS

| | | |
|---|---|---|
| JP | 2001-236301 | 8/2001 |
| WO | 2006082782 | 8/2006 |

OTHER PUBLICATIONS

Japanese Office Action for Japanese Patent Application No. 2010-290041 mailed on Feb. 21, 2012.

*Primary Examiner* — Lance L Barry
(74) *Attorney, Agent, or Firm* — Amin, Turocy & Watson, LLP

(57) ABSTRACT

A processing system and method for connecting to a remote USB device automatically. The processing system and method provide a user computer to be connected to or disconnected from a USB device via a network system and a USB server connected to the USB device. In the beginning, the user computer finds a USB device for the user computer from the USB server via the network system; when detecting that the user computer issues request messages, the USB server connects the user computer with the USB device, and the USB device executes corresponding services according to the request messages issued by the user computer; in the last, after detecting that the USB device has finished the corresponding services according to the request messages issued by the user computer, the USB server is enabled to disconnect the user computer from the USB device.

6 Claims, 4 Drawing Sheets

(56) References Cited

U.S. PATENT DOCUMENTS

| | | | |
|---|---|---|---|
| 7,797,424 B2* | 9/2010 | Ogawa | 709/226 |
| 7,907,292 B2* | 3/2011 | Suzuki | 358/1.13 |
| 7,991,829 B2* | 8/2011 | Takano | 709/203 |
| 8,010,959 B2* | 8/2011 | Mullis et al. | 717/173 |
| 8,527,670 B2* | 9/2013 | Jiang et al. | 710/16 |
| 2001/0015817 A1* | 8/2001 | Adachi | 358/1.13 |
| 2005/0138231 A1* | 6/2005 | Yamaguchi et al. | 710/15 |
| 2006/0123166 A1* | 6/2006 | Toebes et al. | 710/106 |
| 2007/0162949 A1* | 7/2007 | Nitta et al. | 725/134 |
| 2008/0071962 A1* | 3/2008 | Yang et al. | 710/313 |
| 2008/0126628 A1* | 5/2008 | Mullis et al. | 710/63 |
| 2009/0019187 A1* | 1/2009 | Okuma | 710/9 |
| 2009/0303521 A1* | 12/2009 | Kumar | 358/1.15 |
| 2011/0173338 A1* | 7/2011 | Chiu et al. | 709/229 |

\* cited by examiner

PROCESSING SYSTEM AND METHOD FOR CONNECTING A REMOTE USB DEVICE AUTOMATICALLY

BACKGROUND OF THE INVENTION

1. Field of the Invention

This invention relates to a processing system and method for connecting a remote USB device automatically, and more particularly, to a processing system and method for connecting a remote USB device automatically, by using a USB over IP technique to connect/disconnect a user computer to/from a USB device.

2. Description of Related Art

With the rapid development of computer technologies, a variety of computer peripheral devices come to the market. In order for the various devices to communicate with each other and have a high enough transmission speed, the computer peripheral devices are connected through the use of a USB technique. For example, a USB device, such as a printer, fax machine or business machine, may be connected to a computer via a USB and used for the computer. Accordingly, with the development of a network technique and the demand for sharing a USB device, a USB over LP technique comes with the tide of fashion.

The USB over IP technique connects a plurality of computers via a network with a relay server, and the relay server is connected to a USB device via a USB port. The computers are connected to the USB device only when they are using the USB device. In other words, though the computers may be connected to the USB device via the network and a transmission line, the USB device is not connected to any one of the computers unless some of the computers propose connection requests. The remaining computers that do not propose the connection requests may not obtain services. Although the USB over IP technique may realize a plurality of computers sharing a common USB device via a network, since the computers are connected to the USB device via the relay server and USB connection, if the computers that propose the connection requests and are connected to the USB device are still connected to the USB device even after the USB device have provided the services, the other computers may not be connected to the USB device. In practice, the other computers that plan to use the USB device may not propose their connection requests to the USB device unless the computers that are connected to the USB device are disconnected from the USB device. Accordingly, users have to keep watching a connection status of a remote USB device. Therefore, it is inconvenient to use the current USB over IP technique to connect the computers to a remote USB device.

FIG. 1 illustrates a user operating interface having manual connection tools 30 provided by a remote USB device connection system according to the prior art. The manual connection tools 30 provide connecting and disconnecting functions. However, these two functions allow a user to manually connect or disconnect a remote USB device. The operating interface only lists available devices for the user's selection. Accordingly, the user has to select a USB device to which he wants to connect personally. The current remote USB device connection system merely allows a user to manually connect a USB device, and the user has to manually connect or disconnect the USB device, which is inconvenient for the user's operation.

Therefore, how to make a USB device be connected to a plurality of computers and provide services, and solve the problem that a computer that is connected to the USB device is still connected to the USB device even after the computer has obtained the service provided by the USB device, is becoming one of the most urgent issues in the art.

SUMMARY OF THE INVENTION

In view of the above-mentioned problems of the prior art, the present invention provides a processing system and method for connecting a remote USB device automatically, whereby avoiding that a computer is still connected to a USB device even after the USB device has provided corresponding services, so as to promote the usage convenience of a remote USB device.

The processing system is embedded in a user computer, for detecting request messages that are stored in a queue area of the user computer and are not transmitted yet, allowing the user computer to be connected to or disconnected from a USB device via a USB server. The processing system includes: a comparison unit for acquiring device information of the USB device via the USB server and comparing the device information with driver information in the user computer, to find out a consistent USB device for the user computer; a detection unit for detecting a status of the queue area that stores the request messages; a control unit for generating a connection request according to the request messages issued by the user computer, and generating a disconnection request according to the status detected by the detection unit indicating that the request messages stored in the queue area are clear; and a transmission unit for transmitting connection requests or disconnection requests generated by the control unit to the USB server, allowing the USB server to connect the user computer with the consistent USB device found by the detection unit according to the connection requests or disconnect the user computer from a USB device according to the disconnection requests.

The processing method allows a user computer to be connected to or disconnected from a USB device via a network system and a USB server connected to the USB device. The processing method includes the following steps of: (1) the user computer finding a USB device usable for the user computer from the USB server via the network system; (2) when detecting that the user computer issues request messages, the user computer detecting a connection status of a USB device via the USB driver according to the request messages, and the USB server connecting the user computer with the USB device if a detection result of the connection status indicates an idle status, proceeding step (3); if the detection result of the connection status indicates a busy status, keeping detecting the connection status of the USB device, until the detection result of the connection status indicates the idle status, then proceeding to step (3); (3) the USB device executing corresponding services according to the request messages issued by the user computer; and (4) after detecting that the USB device has finished the corresponding services according to the request messages issued by the user computer, enabling the USB server to disconnect the user computer from the USB device.

Compared with the prior art, the processing system and method for connecting a remote USB device automatically of the present invention not only avoid the disturbance that a user has to manually connect or disconnect, by using the USB over IP technique, a remote USB device personally in the prior art, but also solve various problems, such as no use connection occupation, waiting for connection and finding and corresponding a usable USB device personally. The present invention allows a user to execute a service request process conveniently.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
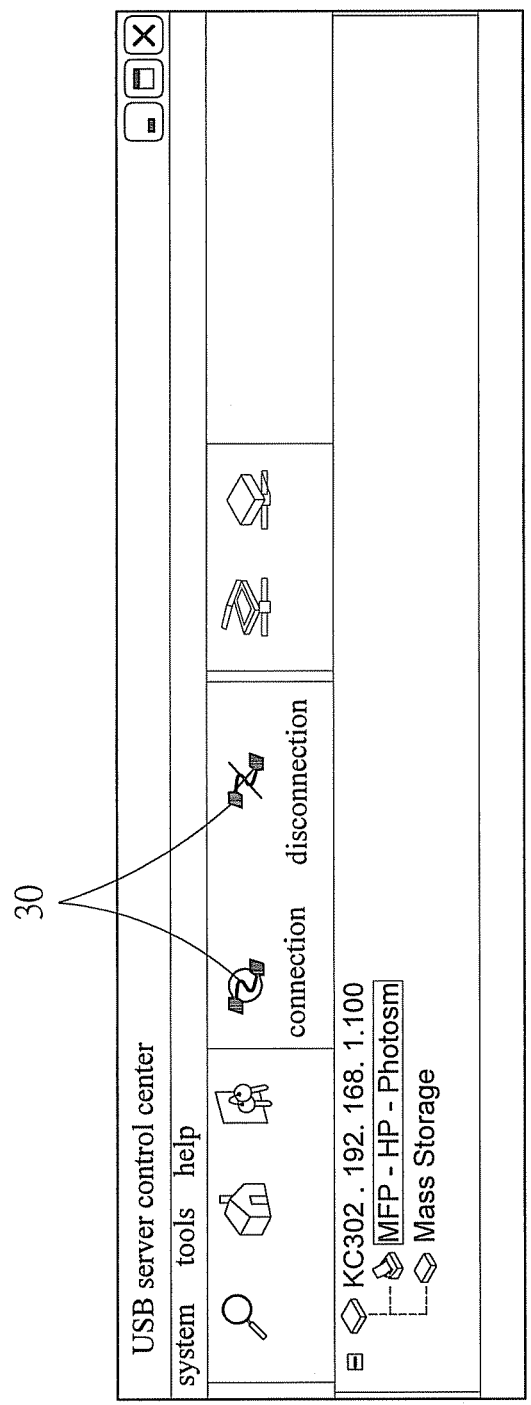
FIG. 1 illustrates a user operating interface having manual connection tools provided by a remote USB device connection system according to the prior art.
Figure 2:
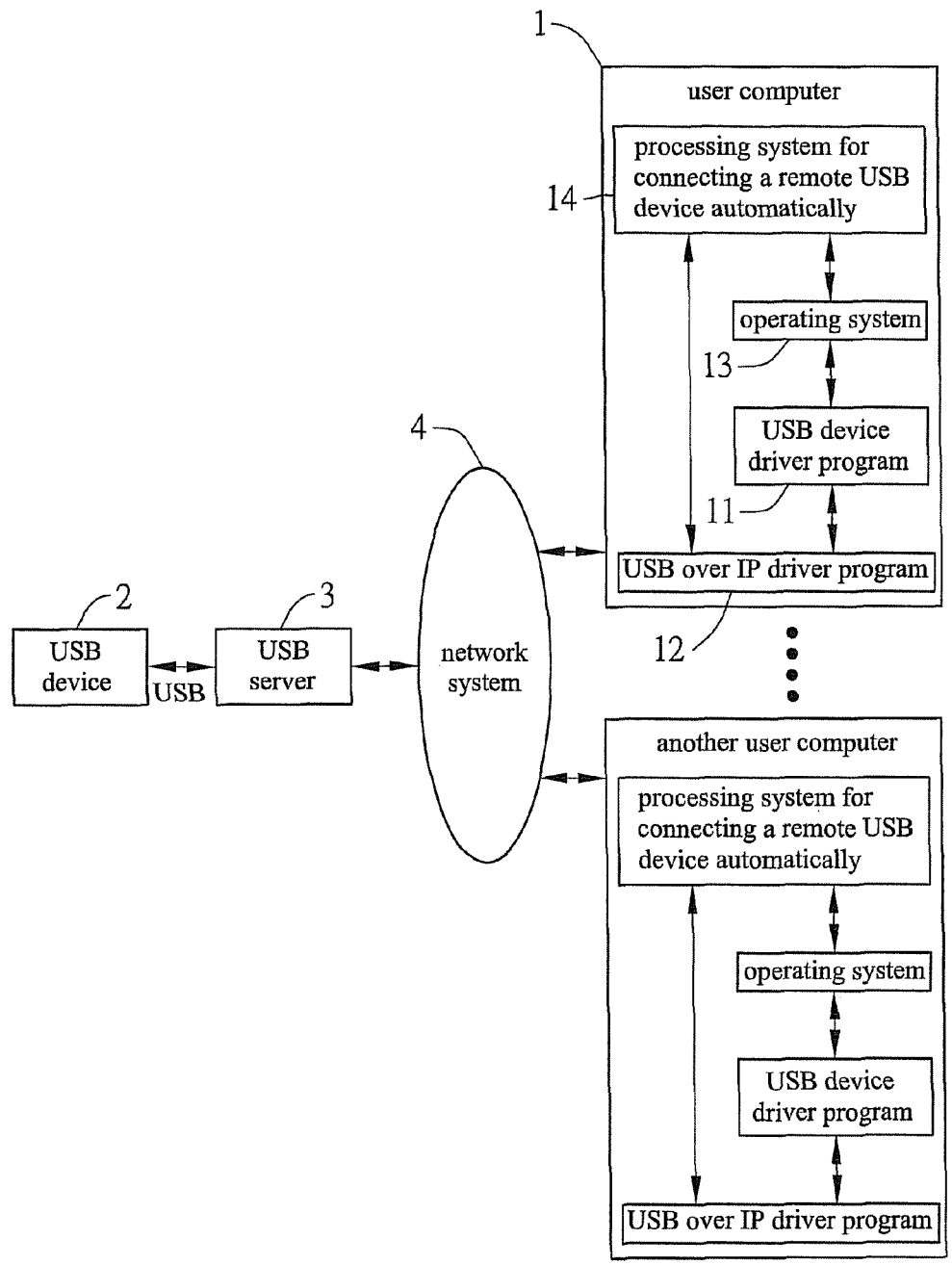
FIG. 2 is a system structural diagram illustrating how a user at a computer end applies a processing system that is connectable to a remote USB device automatically according to the present invention to a USB device.

FIG. 2 is a system structural diagram illustrating how a user at a computer end applies a processing system that is connectable to a remote USB device automatically according to the present invention to a USB device. As shown in FIG. 2, a user computer 1 is connected to a remote USB device 2 not via a physical USB port, but via the USB over IP technique, while the USB device 2 is connected via a physical USB port to a USB server 3. The USB server 3 acts as a transmission medium for transmitting instructions or data between the user computer 1 and the USB device 2. The user computer 1 is connected to the USB server 3 via a network system 4 such as a local area network (LAN). The network system 4 is a wireless network or a wired network. Accordingly, the USB server 3 has a network protocol for communicating with the network system 4, a USB port for connecting the USB device, and firmware for communicating with a processing system 14 of the present invention. An IP USB Hub, IP sharer having a USB port or a router having a USB port may be used to realize the USB server 3. Therefore, a plurality of user computers 1 may share the remote USB device 2 through the use of the USB server 3.

In an embodiment of the present invention, the user computer 1 has to be installed with a USB device driver program 11, a USB over IP driver program 12, an operating system 13 and the processing system 14 for connecting a remote USB device automatically according to the present invention. When the user computer 1 is turned on, the processing system 14 that is connected to a remote USB device automatically may be resided in an operating system 13, so as to detect request messages controlled by the operating system 13 at any time, and timely drive the USB device driver program 11 and the USB over IP driver program 12 according to the request messages. In practice, when the user computer 1 plans to use the remote USB device 2, the processing system 14 that is connected to a remote USB device automatically may detect request messages generated by the operating system 13, and the processing system 14 that is connected to a remote USB device automatically may connect the user computer 1 to the USB device 2 via the USB over IP driver program 12. The processing system 14 that is connected to a remote USB device automatically enables, via the detected request messages, the operating system 13 to control the USB device driver program 11 to generate instructions and data corresponding to the request messages. Then, the instructions and data are captured and analyzed by the USB over IP driver program 12, transmitted via the network system 4 to the USB server 3, and received and transferred by the USB server 3 to the remote USB device 2, to finish the request messages to be executed. As shown in FIG. 2, instruction messages in the user computer 1 transmitted among the processing system 14 that is connected to a remote USB device automatically, the operating system 13, the USB device driver program 11 and the USB over IP driver program 12 are instructions that a user plans to execute on the USB device 2, such as printing and faxing, and message instructions transmitted between the processing system 14 that is connected to a remote USB device automatically and the USB over IP driver program 12 are instructions for performing connecting and disconnecting functions.

On the other hand, the processing system 14 that is connected to a remote USB device automatically detects instruction messages sent by the USB device 2 back to the user computer 1 at any time, and the USB over IP driver program 12 analyzes and transmits the instruction messages to the USB device driver program 11, so as to disconnect the user computer 1 from the USB device 2 automatically when detecting that the USB device 2 has finished the services for the request messages. Therefore, the processing system 14 that is connected to a remote USB device automatically according to the present invention allows, by using the USB over IP technique, a user to connect/disconnect the user computer 1 to/from the remote USB device 1 by merely using the operating system 13 to issue request messages. Thus, it is easy for the operation.

Figure 3:
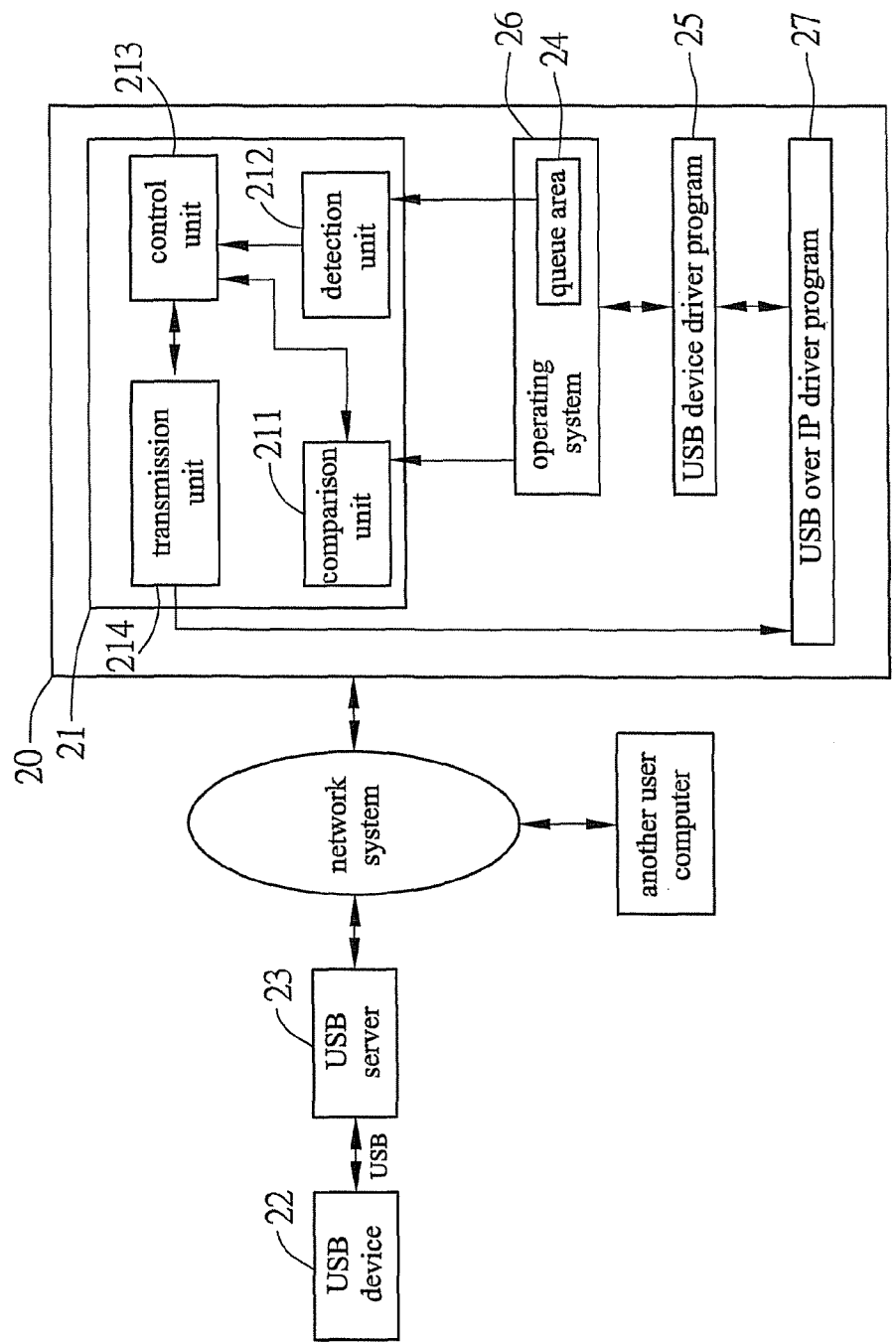
FIG. 3 is a functional block diagram of a processing system that is connectable to a remote USB device automatically according to the present invention.

FIG. 3 is a functional block diagram of a processing system that is connectable to a remote USB device automatically according to the present invention. As shown in FIG. 3, a processing system 21 that is connected to a remote USB device automatically allows a user computer 20 to be connected to a remote USB device 22 via a USB server 23. The processing system 21 that is connected to a remote USB device automatically comprises a comparison unit 211, a detection unit 212, a control unit 213 and a transmission unit 214. The processing system 21 that is connected to a remote USB device automatically controls the user computer 20 to be connected to or disconnected from the remote USB device 22, so as to achieve the function that the user computer 20 is connected to the remote USB device 22 automatically when the user computer 20 uses the remote USB device 22 and is disconnected from the remote USB device 22 automatically when the user computer 20 stops using the remote USB device 22. Note that since an operating system 26, a USB device driver program 25 and a USB over IP driver program 27 are well-known computer peripheral device controlling and processing techniques, further description hereby omitted. In order to simplify the drawings and description, only the components of the system structure that relate to the present invention are described in the following paragraphs.

A comparison unit 211 acquires device information of the remote USB device 22 via the USB server 23, and compares the acquired device information with driver information of the USB device driver program 25 of the user computer 20, to find out the remote USB device 22 that may be used by the user computer 20. In detail, the comparison unit 211 helps to find out the USB device 22 that the user computer 20 may use, and corresponds the remote USB device 22 (i.e., a physical device) to the device driver information stored in the user computer 20, whereby finding an available device that may be connected to the user computer 20. In practice, the USB server 23 captures various device information, such as vendor ID, product ID and serial number, of the remote USB device. Since the USB server 23 is connected to the USB device 22 via a USB interface, the aforesaid device information may be captured according to a USB specification standard, and then compared with the device driver information in the user computer 20. The device driver information may be stored in a Registry in the operating system 26 of the user computer 20, whereby identifying whether the remote USB device 22 may be connected to the user computer 20 and provide services.

The detection unit 212 detects request messages issued by the user computer 20. After the comparison unit 211 has finished the setting work of the USB device 22 that the user computer 20 may use, the detection unit 212 starts to keep detecting the user computer 20, in order to know whether the user computer 20 has issued any request messages. In other words, the detection unit 212 starts to monitor whether a queue area 24 provided for receiving the request messages is stored with the request messages, to determine whether the remote USB device 22 should be connected to the user computer 20 and provide corresponding services.

When the detection unit 212 detects that the queue area 24 has the request messages, a status of the USB device 22 is obtained via the USB server 23. Since the USB server 23 may control whether the USB device 22 is connected to any user computer, a connection status of the USB device 22 may be known via the USB server 23.

The control unit 213 generates connection requests according to request messages issued by the user computer 20, and generates disconnection requests according to that the detection unit 212 has detected that the request messages stored in the queue area 24 are clear.

The transmission unit 214 transmits the connection requests and the disconnection requests generated by the control unit 213 to the USB server 23, whereby the user computer 20 may be connected to or disconnected from the USB device 22 automatically. In an embodiment, under a condition that the USB device 22 is not connected to the user computer 20, the control unit 213 transmits via the transmission unit 213 the connection requests. The connection requests are received by the USB over IP driver program 27 and transferred to the USB server 23. The USB server 23 thus connects the user computer 20 to the USB device 22.

On the other hand, if the remote USB device 22 is occupied by a user computer (not shown) at another end when the control unit 213 of the user computer 20 at a local end generates the connection requests, the queue area 24 of the user computer 20 at the local end is still stored with request messages corresponding to the connection requests, until the user computer at the another end is disconnected to the USB device 22 and releases the usage right of the USB device 22. Thus, the USB server 23 may connect the user computer 20 at the local end to the USB device 22 according to the connection requests issued by the control unit 213 of the user computer 20 at the local end.

When the USB device 22 has executed all the request messages issued by the user computer 20 at the local end that is connected to the USB device, and the contents stored in the queue area 24 of the user computer 20 at the local end are clear, i.e., the detection unit 212 of the user computer 20 at the local end detecting that the queue area 24 does not have any request messages, the control unit 213 transmits via the transmission unit 214 disconnection requests, which disconnect the USB device 22 from the user computer 20 at the local end when the user computer 20 at the local end does not use the USB device 22, whereby avoiding the problem that the user computer 20 is still connected to the USB device 22 even when the USB device 22 has finished all the request messages generated by the user computer 20.

In an embodiment, the USB device is a printer or a business machine, and the request messages are printing requests, whereby achieving automatic connection and execution of a printing process.

In another embodiment, the USB device is a fax machine, and the request messages are fax requests, whereby achieving automatic connection and execution of a fax process. In other words, the fax machine that has a USB port has the same connection mechanism as described previously, under the application of the USB over IP technique. Similarly, the fax machine detects request messages and determines to be connected to or disconnected from the user computer. Therefore, the aforesaid technique may be applied to the fax process.

In order to identify a usage status and record that the user computer 20 of the processing system 21 that is connected to a remote USB device automatically uses the USB device 22, a monitoring system (not shown) is installed in the USB server 23. The monitoring system includes a user identification module, a usage time management module and a usage record storage module. The user identification module has at least a user identification account and a password corresponding to the user identification account. The user identification account identifies connection authorization of the user computer 20 to requesting the USB server 23 to connect the user computer 20 with the USB device 23. In other words, when a user at the user computer 20 end plans to use the USB device 22, he has to input the user identification account and the password corresponding to the user identification account, or he cannot use the USB device 22. Through the account and password, the user computer 20 and the USB server 23 are allowed to be identified for connection, so as to promote the security of system usage. The user identification account and the password are provided when the USB over IP driver program 22 of the user computer 20 and the USB server 23 perform a TCP/IP connection process, and are transmitted from the user computer 20 to the user identification module of the USB server 23 for comparison. If the comparison is wrong, an error code is transmitted back to the user computer 20, and the TCP/IP connection process ends immediately.

The usage time management module is used for storing corresponding usage time regulation information for the user identification account, and the usage time regulation information may be set by apparatus management personnel. The usage time regulation information may be time when connection usage is limited or allowed. For example, if a user A is allowed to use the connection from 8 A.M. to 6 P.M., when the user A plans to connect the USB device 22, the usage time management module of the USB server 23 checks whether the time when the user A proposes a establishing connection request complies with the time when the user A is allowed to use the connection. If the time when the user A proposes a establishing connection request does not comply with the time when the user A is allowed to use the connection, the USB server transmits an error code back to the user computer 20, and ends the TCP/IP connection process immediately.

The usage record storage module records the proposed connection requests or the user identification accounts that establish or interrupt the connection relation, and the user may check the USB device 22 based on the record. Therefore, the circumstance that the user uses the USB device 22 may be controlled effectively.

Figure 4:
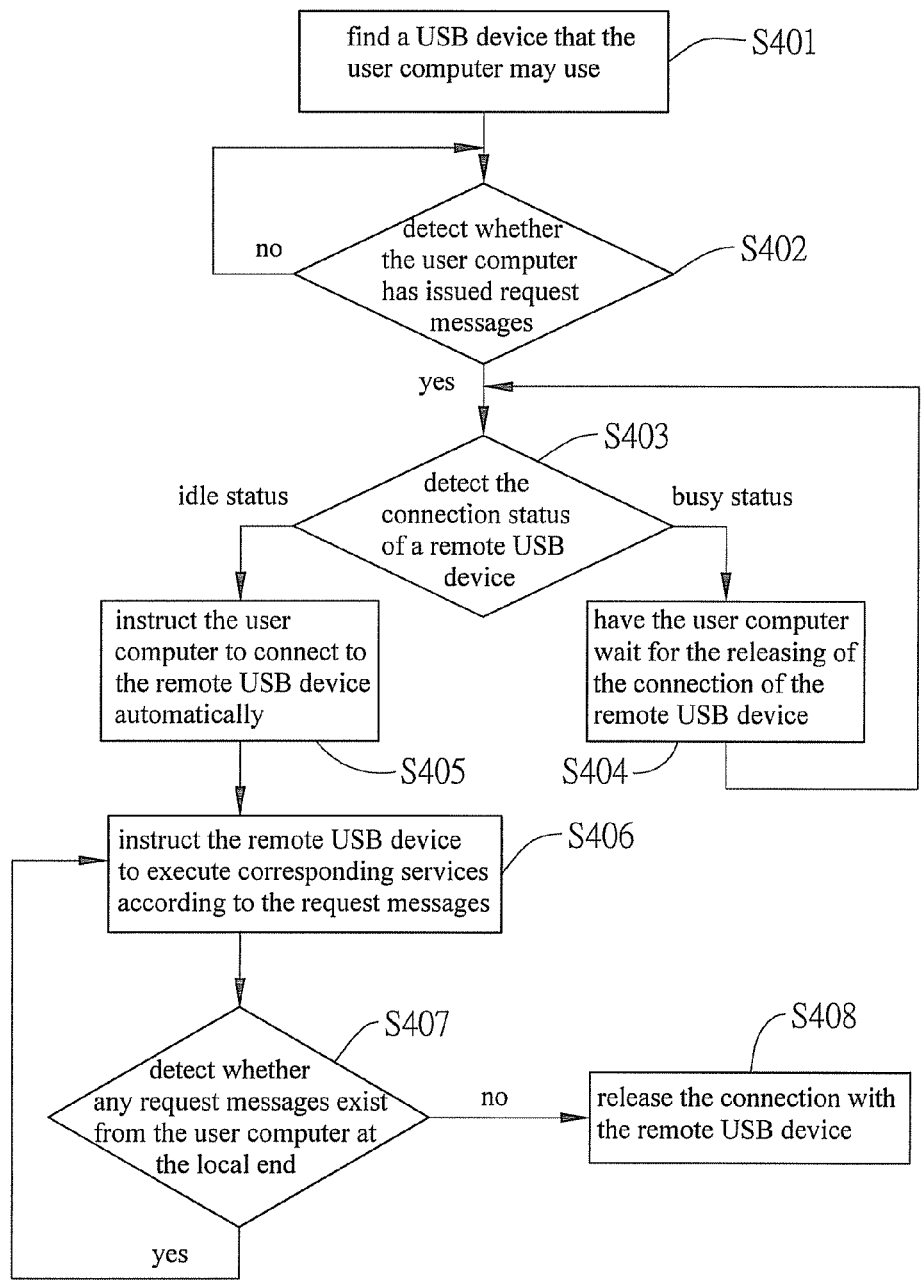
FIG. 4 is a flow chart of a processing method for connecting a remote USB device automatically according to the present invention.

FIG. 4 is a flow chart of a processing method for connecting a remote USB device automatically according to the present invention. As shown in FIG. 4, in step S401, find a USB device that the user computer may use, that is, finding an available USB device at the user computer end and presetting the USB device as a target to be connected to the user computer, for the USB device to be connected to the user computer when request messages are generated later. The aforesaid finding is performed by comparing USB device information stored in the USB server with driver information stored in the user computer, and taking the USB devices as USB devices that the user computer may use and presetting one of the USB devices as a USB device that is connected to the user computer automatically when the USB device information comply with the driver information. Proceed to step S402.

In step S5402, detect whether the user computer has issued request messages that are stored in the queue area, and proceed to step S403 if the user computer has issued the request messages, or keep performing step S402 if the user computer does not issue any request messages.

In step S403, the user computer detects connection statuses of a remote USB device via the USB server. The connection statuses include an idle status and a busy status. If the remote USB device is in the idle status, proceed to step S405. If the remote USB device is in the busy status, proceed to step S404.

In step S404, since the remote USB device is in the busy status, the user computer that proposes the request messages waits for a user computer at another end to release the connection status of the ISB device, and return to step S403.

In step S405, since the remote USB device is in the idle status, the user computer that proposes the request messages may use the USB over IP technique to automatically connect the remote USB device via the network system and the USB server. Proceed to step S406.

In step S406, the remote USB device executes corresponding services according to the user computer that proposes the request messages. Proceed to step S407.

In step S407, detect whether there is any request message at the user computer at the local end, that is, checking whether the queue area at the local end is clear. If the queue area at the local end is not clear, which indicates that there are remaining request messages, proceed to step S406, allowing the remote USB device to execute corresponding services according to the request messages. On the contrary, if the queue area at the local end is clear, which indicates no request message is left, proceed to step S408.

In step S408, release the connection of the user computer that proposes the request messages with the remote USB device. A user computer at another end may be connected to the remote USB device, to avoid that the connection is occupied by the user computer.

Note that in step S401, before the USB device information stored in the USB server are compared with the driver information stored in the user computer, the USB server has to check the user identification account of the user computer. In short, both the USB server and the user computer are installed with the user identification account. When the user identification account of the user computer complies with the user identification account of the USB, the USB server allows the user computer to find and compare a USB device that the user computer may use and perform a comparison process.

Before the execution of step S403, that is, before the user computer detects the connection status of the remote USB device, the USB server has to check whether the time when the user computer sends the request messages complies with the time when the user computer is allowed to use the USB device, allowing the USB server to manage the timing when each user computer uses the USB device effectively.

Besides, before the execution of step S405 and step S408, that is, before connecting/disconnecting the user computer to/from the remote USB device, the USB server records that the user computer uses the USB device, whereby controlling the circumstance that the user uses the USB device.

In sum, the present invention provides a processing system and method for connecting a remote USB device automatically. Compared with the prior art, the processing system detects request messages issued by the user computer, and connects the user computer to the remote USB device automatically, by using the USB over IP technique, according to the connection status of the remote USB device, to satisfy the required services. The present invention has advantages that a user does not need to manually disconnect a user computer from the remote USB device, and the user does not need to perform a corresponding effect for the user computer and the remote USB device personally. The processing system, if cooperating with a USB server having a safety mechanism, may control the connection of the user computer with the remote USB device effectively, and save the connection records, whereby the processing system and method for connecting a remote USB device automatically of the present invention may provide more perfect services.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A processing system that is connectable to a remote universal serial bus (USB) device automatically and embedded in a user computer, for detecting request messages that are stored in a queue area of the user computer and are not transmitted yet, allowing the user computer to be connected to or disconnected from a USB device via a USB server, the processing system comprising:

a processor and memory, the memory storing instructions that when executed by the processor provide:

a comparison unit for acquiring device information of the USB device via the USB server and comparing the device information with driver information in the user computer, so as to find out a consistent USB device for the user computer;

a detection unit for detecting a status of the queue area that stores the request messages and a status of the USB device via the USB server;

a control unit connected to the comparison unit and the detection unit for generating a connection request according to the request messages issued by the user computer, and generating a disconnection request according to the status detected by the detection unit indicating that the request messages stored in the queue area are clear; and a transmission unit connected to the control unit for transmitting connection requests or disconnection requests generated by the control unit to the USB server, allowing the USB server to connect the user computer with the consistent USB device found by the detection unit according to the connection requests or disconnect the user computer from a USB device according to the disconnection requests, wherein the device information of the USB device is a vendor identity (ID), a product ID, or a serial number of the USB device, and if the USB device is occupied by another user computer when the control unit generates the request messages, the request messages are still stored in the queue area, until the another user computer is disconnected to the USB device.

2. The processing system of claim 1, wherein the USB server includes a user identification module that has at least a user identification account and a password corresponding to the user identification account, the user identification account identifying connection authorization of the user computer to requesting the USB server to connect the user computer with the USB device.

3. The processing system of claim 2, wherein the USB server further has a usage time management module for storing usage time regulation information corresponding to the user identification account, so as to regulate time when the user computer is connected to the USB device.

4. The processing system of claim 3, wherein the usage time regulation information are the time when connection usage is limited or allowed.

5. The processing system of claim 2, wherein the USB server further comprises a record storage module for recording a user identification account that proposes the connection requests or disconnection requests.

6. The processing system of claim 1, wherein the USB server is a network apparatus that has a network protocol for communicating with a network system, a USB port for connecting to the USB device, and firmware for communicating with the processing system.

\* \* \* \* \*